United States Patent [19]

Kawai

[11] 4,331,988
[45] May 25, 1982

[54] CASSETTE BASE FOR A VIDEO TAPE RECORDER

[75] Inventor: Tsutomu Kawai, Yokosuka, Japan

[73] Assignees: Funai Electric Co., Ltd., Osaka; Efuti Giken Co., Ltd., Kanagawa, both of Japan

[21] Appl. No.: 147,822

[22] Filed: May 8, 1980

[51] Int. Cl.³ .................... G11B 15/00; G11B 23/04
[52] U.S. Cl. ............................ 360/96.6; 242/198
[58] Field of Search ............... 360/96.6, 96.5, 93, 360/132, 137; 242/197–200

[56] References Cited

U.S. PATENT DOCUMENTS 3,900,170  8/1975  Serizawa ........................ 360/96.6
3,950,787  4/1976  Hosaka ............................ 360/93

Primary Examiner—Alfred H. Eddleman
Attorney, Agent, or Firm—Fisher, Christen & Sabol

[57] ABSTRACT

A mounting base to support and position a magnetic tape cassette on the chassis of a video tape recorder consists of a generally rectangular plate in which the supports for the cassette consist of marginal portions of the plate which are partially severed from the remainder of the plate and upwardly bent to contact the bottom of the cassette. The cassette is of the type in which the tape is carried by a pair of spools, and has an upwardly tiltable lid along one side to allow the tape to be withdrawn from operation. The cassette is first received in a mounting case which is vertically tiltably mounted on the recorder chassis. Spaces are provided in the base for the driving reels and the tape withdrawal mechanism of the recorder and when the case moves the cassette downwardly, the upwardly bent portions of the base plate flip open the lid and also properly level the cassette.

4 Claims, 3 Drawing Figures

CASSETTE BASE FOR A VIDEO TAPE RECORDER

BACKGROUND OF THE INVENTION

This invention relates video tape recorders of the type wherein the tape is stored in a cassette in which the supply and takeup spools are mounted side by side in the same plane and one side of the cassette is provided with a pivoted lid which is opened to allow the tape to be drawn out by at least one take-out pin mechanism movably mounted on the recorder. The recorder is also provided with a pair of driving reels for rotating the spools and the cassette is provided with openings in one face which allows the take-out pin mechanism to engage with the tape extending between the spools and wrap it around a rotary video transducer head and to permit the driving reels to engage with the respective spools when the recorder is in use.

The recorder is also provided with a cassette case which tilts upwardly to allow the cassette to be slid into, and out of, the cassette case and is moved downwardly to a predetermined position to allow the take-out mechanism and driving reels to become operative. At least one device, such as an upwardly projecting member, engages with the lid to open it as the cassette is lowered into operating position.

SUMMARY OF THE INVENTION

An object of the present invention is to provide a base plate for precisely locating the cassette when it has been lowered into its operative position which is simple to form and inexpensive to make. In a preferred form, the plate can be stamped from a single rectangular sheet with the appropriate openings cut out and a number of supporting elements for the cassette being integrally formed on the margins thereof by partial severing of the material and upwardly bending the elements thereby formed.

DESCRIPTION OF A PREFERRED EMBODIMENT OF THE INVENTION

Figure 1:
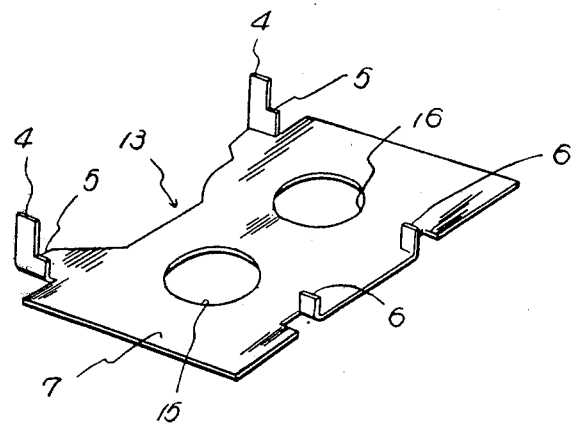
FIG. 1 is a perspective view of a preferred form of base plate made in accordance with the invention.
Figure 2:
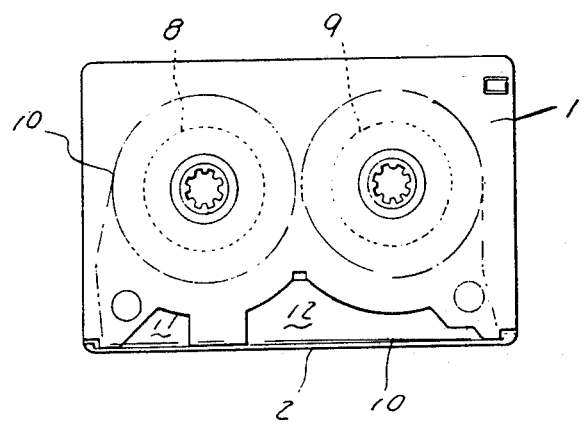
FIG. 2 is a bottom view of a cassette.

In the drawing a cassette, indicated generally by numeral 1, is shown as being provided with a lid 2 covered an opening along the front side and pivoted to the cassette by pins 3. The lid usually is biassed, by means not shown, towards its closed position, and when the cassette is lowered into operating position the lid is opened, as will be explained, to allow the tape to be drawn out.

The lower face, or bottom, of cassette 1 is provided with cutout portions 11 and 12 along its front margin to permit the entry into the cassette behind the tape 10 which stretches across the front opening, of a take-out mechanism when the tape is in its unloaded condition. This take-out mechanism may include draw-out pins, or pinch rollers (not shown) which draw the tape 10 from the spools, or reels 8 and 9 within the cassette and upon which it is wound, and move it to its loaded position on the recorder.

Figure 3:
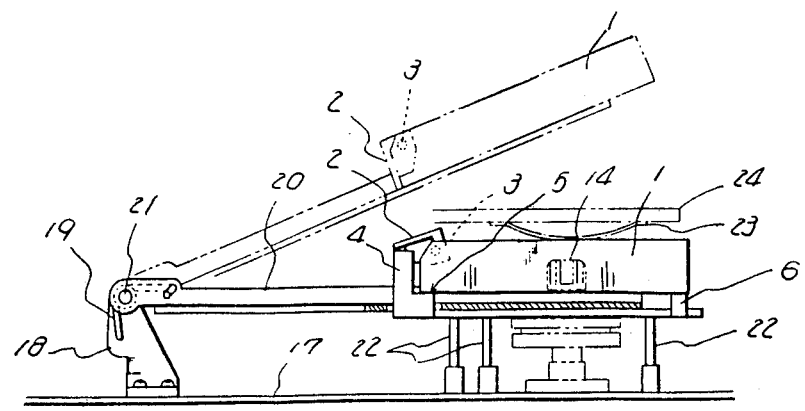
FIG. 3 is a side elevation of a cassette case tiltably mounted on a recorder chassis and with base plate in place, and with the cassette case shown in its upwardly tilted position in broken lines.

As shown in FIG. 1, the base plate according to this invention is indicated generally by numeral 7 and comprises a rectangular element of sheet material having portions of the sheet material at opposite corners at one side partially severed and bent upwardly to form the upstanding portions 4 which, when the cassette is lowered onto the base, contact the opposite ends of the lid 2 and raise it to expose tape 10, as shown in FIG. 3. Some of the material of each of the upstanding portions 4 are cut away to form the steps 5 which abut against the lower surface at the front corners of the cassette, while at the opposite side of the base, portions of the material along the margin are partially severed to allow them to be bent up to form another pair of upstanding members 6, which also contact the lower surface of the cassette and therefore support it, with the upstanding portions 5, in its proper position in relation to the operating mechanisms of the recorder.

Furthermore, the plate 7 is also cut away along its central front margin to provide a recessed margin 13 which provides a space corresponding to the openings 11 and 12 in the cassette to permit entrance of the tape drawing-out mechanism. The base plate 7 is also provided with a pair of openings 15 and 16 to allow for the presence of the reel shafts which rotate the tape carrying spools. Only one of these shafts is shown in FIG. 3.

As can be seen in FIG. 3, the base 7 is mounted on the recorder chassis 17 by means of a number of support legs 22. On the other hand, the cassette mounting case, indicated generally by numeral 20, is supported by pivot 21 mounted on upright bracket 18 attached to the chassis 17 and is tiltable under the influence of spring 19. The case 20, in its upwardly tilted position, as shown by the broken lines in FIG. 3, allows the cassette to be inserted into, and withdrawn from, the case so that when the case is swung downwardly the cassette is mounted on the base plate 7, as shown in solid lines. In this position the reel shafts 14 projecting through the openings 15 and 16 engage with the tape spools, and the bottom surface of cassette 1 abuts against the upstanding portions 5 and 6 of the base 7 to set the cassette in its perscribed position. At this point a leaf spring 23, attached to the cover 24 of the case, pushes against the upper surface of the cassette to hold it in position.

Simultaneously, while the cassette is being lowered, the lid abuts against the upwardly projecting portions 4 which causes the lid to tilt upwardly about its supporting pins 3, thereby making it possible to draw out the tape 10 from the cassette.

I claim:

1. In a cassette mounting base for a video tape recorder of the type wherein the cassette is to be received within an upwardly tilted cassette case mounted on the chassis of a recorder to be tilted downwardly in said case to a predetermined position with respect to said chassis for operation, said cassette being provided with access openings in the bottom thereof for the driving reels and at least one take-out means provided on the recorder for operating the tape spools in the cassette and for withdrawing the tape from the cassette to be loaded into engagement with the recorder magnetic transducing head means, said cassette also being provided with a pivotally mounted lid along one side normally biassed to a closed position, the recorder being provided with an upwardly projecting member to open said lid upon downward movement of the cassette in the tiltable case to said predetermined position, the improvement which comprises a mounting base plate to be mounted by at least three vertical legs projecting upward from the chassis of a recorder horizontally positioned below said tiltable cassette case, said base plate being provided with openings to accommodate said driving reels and take-out means, said base plate being provided with at least three integrally formed upwardly projecting support means for opening said lid of a cassette and to support the cassette independently of the cassette case in said predetermined position when the cassette case is downwardly tilted.

2. A cassette mounting base as defined in claim 1, wherein at least two of said upwardly projecting support means is provided with two vertically and horizontally offset horizontal surfaces one of said surfaces engaging with the lid of the cassette to open the lid, the other of the surfaces to engage the bottom of the cassette upon said downward movement of the cassette.

3. A cassette mounting base as defined in either one of claims 1 or 2, wherein said base comprises a generally rectangular plate, and at least two of said upwardly projecting support means are located at the respective opposite ends of one side margin of the plate, and are each defined by a portion of the material of the plate at said opposite ends which has been partially severed from the remaining material and upwardly turned.

4. A cassette mounting base as defined in claim 3, wherein said two upwardly projecting support means are located at the side of a cassette from which the tape is withdrawn to be loaded, and a third upwardly projecting support means is located medially of the side margin opposite to said one side margin, said third support means being defined by a partially severed portion of material of the plate.

* * * * *